(12) United States Patent
Shulman et al.

(10) Patent No.: US 10,548,008 B2
(45) Date of Patent: Jan. 28, 2020

(54) CUSTOM FAST SESSION TRANSFER SECURITY HANDSHAKE

(71) Applicant: Qualcomm Atheros, Inc., San Diego, CA (US)

(72) Inventors: Vladimir Shulman, Haifa (IL); Vladimir Kondratiev, Haifa (IN); Boris Sorochkin, Beer Sheva (IL)

(73) Assignee: Qualcomm Incorporated, San Diego, CA (US)

( * ) Notice: Subject to any disclaimer, the term of this patent is extended or adjusted under 35 U.S.C. 154(b) by 409 days.

(21) Appl. No.: 15/223,940

(22) Filed: Jul. 29, 2016

(65) Prior Publication Data

US 2018/0035289 A1 Feb. 1, 2018

(51) Int. Cl.
*H04W 12/06* (2009.01)
*H04L 29/06* (2006.01)
*H04L 29/08* (2006.01)

(52) U.S. Cl.
CPC .............. *H04W 12/06* (2013.01); *H04L 63/08* (2013.01); *H04L 67/148* (2013.01)

(58) Field of Classification Search
None
See application file for complete search history.

(56) References Cited

U.S. PATENT DOCUMENTS

| | | | |
|---|---|---|---|
| 2010/0332822 A1* | 12/2010 | Liu | H04W 12/04 713/151 |
| 2012/0327851 A1* | 12/2012 | Wentink | H04W 76/14 370/328 |
| 2013/0266136 A1* | 10/2013 | Chu | H04K 1/003 380/34 |
| 2014/0247711 A1* | 9/2014 | Gantman | H04W 88/06 370/221 |
| 2014/0259136 A1* | 9/2014 | Levy | H04L 63/0876 726/7 |
| 2015/0063295 A1* | 3/2015 | Himayat | H04W 36/0022 370/331 |

* cited by examiner

Primary Examiner — Henry Tsang
(74) Attorney, Agent, or Firm — Neugeboren O'Dowd PC

(57) ABSTRACT

A method and device for authenticating wireless communication links between devices. The method may comprise sending a first frame from first device to a second device. The first frame may comprise a header and a payload containing data packets for implementing a first Extensible Authentication Protocol. A first secure link may be established between the first network interface card of the first device and the first network interface card of the second device, then an action management frame may be sent across the first link. The action management frame may comprise the header, a payload comprising a vendor-specific information element containing identifying information about the first device, and an action that instructs the second device to implement a second Extensible Authentication Protocol through a second network interface card of the second device. A second secure link may be established between the second network interface cards of each device.

17 Claims, 9 Drawing Sheets

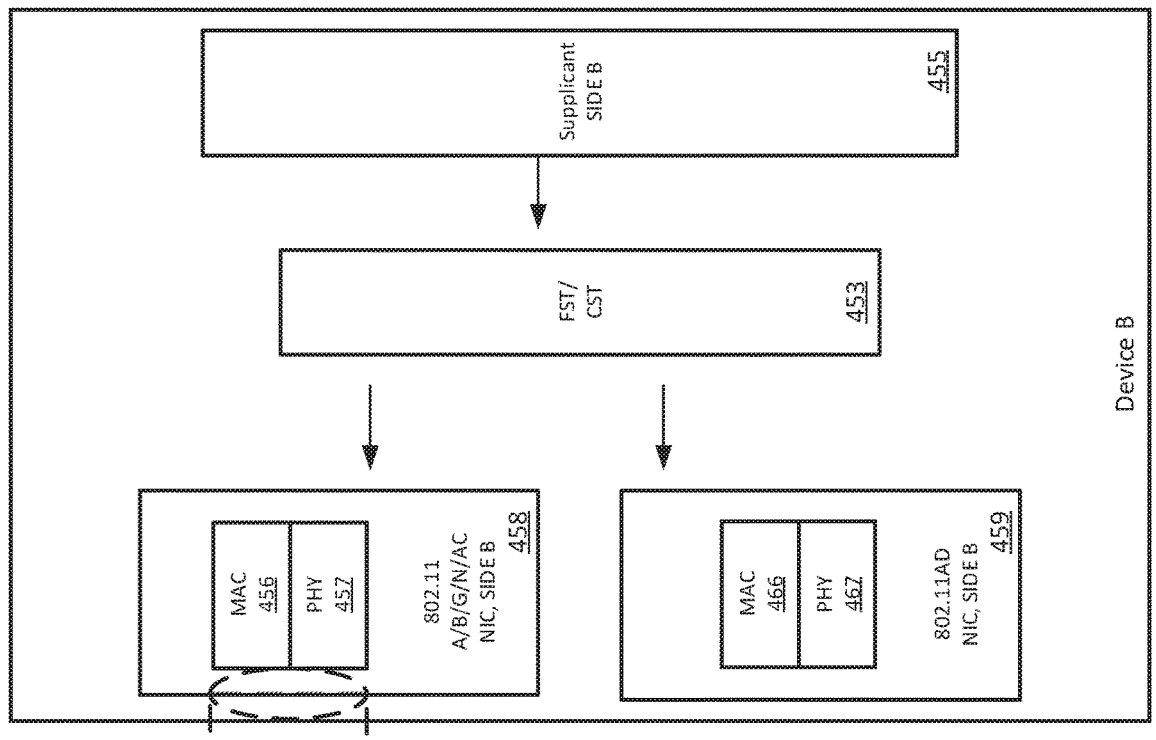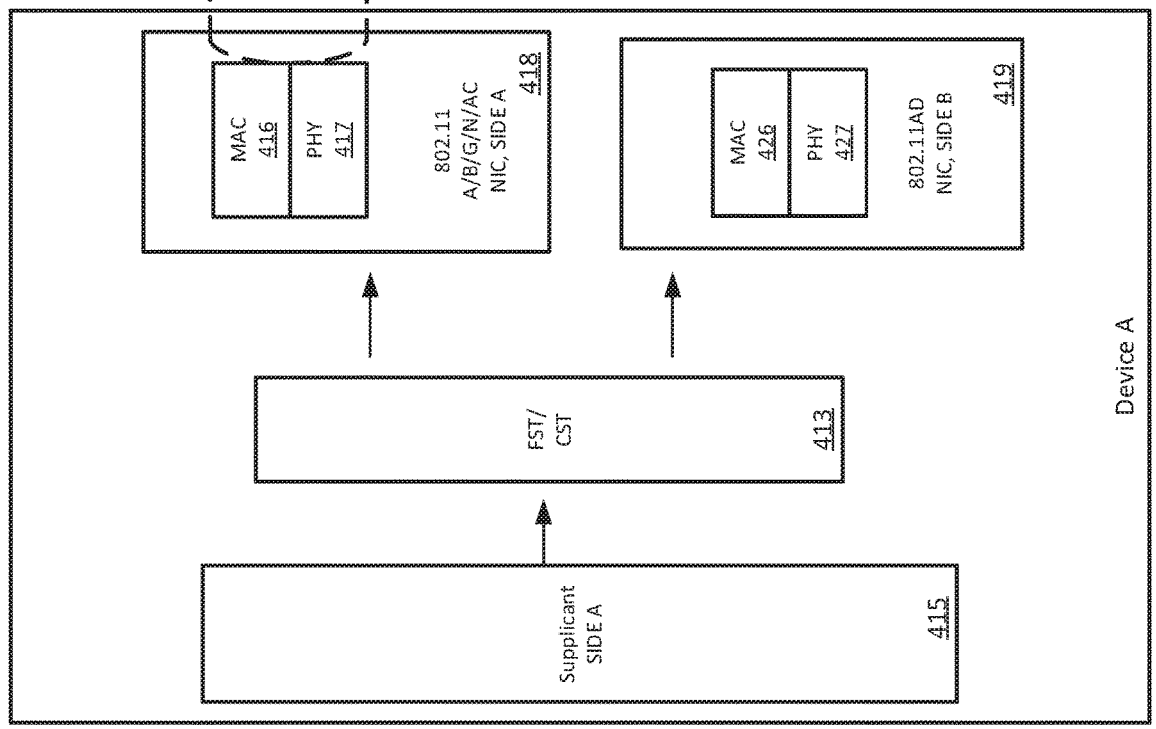
FIG. 4B

CUSTOM FAST SESSION TRANSFER SECURITY HANDSHAKE

FIELD OF THE DISCLOSURE

The present disclosure relates to security handshakes. In particular, but not by way of limitation, the present disclosure relates to apparatuses and methods for improving the security of connections between multi-band wireless devices.

BACKGROUND OF THE DISCLOSURE

As computing devices have increasingly become connected to the Internet via wireless connections, various improvements have been made to the speed with which devices can transmit and receive information, and the security through which devices may communicate with one another. One important aspect of wireless network security is the authentication of an initial connection between two devices, which often involves techniques such as passwords, challenges, encryption, and keys. These techniques are implemented through various authentication protocols known as security handshakes. Certain types of security handshakes can be susceptible to malicious third-party attacks though devices that eavesdrop on security information and impersonate one or more of the devices that are trying to establish a secure connection.

With recent advances in wireless technology, new frequencies have begun to be used for transmitting wireless data. Today, many wireless devices are capable of transmitting and receiving information over both traditionally used frequency bands and new frequency bands. Sometimes, devices must switch the frequency bands on which they communicate. As a result, new protocols have been developed to facilitate the switching of the frequency bands within the same device. Due to the existence of the multiple bands, the protocols often require two separate security handshakes. Though techniques have been developed to allow such handshakes to be conducted in a fairly secure manner, utilizing only one of the bands to perform both security handshakes, these existing techniques require modifications to existing devices that create compatibility issues. As a result, a need exists for implementing multiple security handshakes over a single frequency band in a way that does not require extensive modification to the devices.

SUMMARY

One aspect of the disclosure provides a method for authenticating wireless communication links between devices including a plurality of network interface cards. The method may comprise sending a first frame from a first network interface card on first device to a first network interface card on a second device. The first frame itself may comprise a first MAC header that identifies a destination address as a MAC destination address of the first network interface card on the second device and a payload including data packets for implementing a first Extensible Authentication Protocol. The method may then comprise establishing a first secure link between the first network interface card of the first device and the first network interface card of the second device via the first Extensible Authentication Protocol and then sending an action management frame to the first network interface card on the second device across the first secure link. The action management frame may comprise the first MAC header and a payload comprising, the payload itself comprising a vendor-specific information element containing identifying information about a second network interface card on the first device and data packets for implementing a second Extensible Authentication Protocol. The payload may also comprise an action that instructs the second device to implement the second Extensible Authentication Protocol through a second network interface card of the second device. Then, the method may include establishing a second secure link between the second network interface card of the first device and the second network interface card of the second device.

Another aspect of the disclosure provides a wireless communication device. The wireless communication device may comprise a transceiver, a first network interface card, and a second network interface card. The first network interface card may be configured to send a first frame via the transceiver to a first network interface card of a second wireless communication device. The first frame may comprise a first MAC header that identifies a destination address as a MAC destination address of the first network interface card of the second wireless communication device, and a payload containing data packets for implementing a first Extensible Authentication Protocol. The first network interface card may then establish a first secure link between the first network interface card of the wireless communication device and the first network interface card of the second device via the first Extensible Authentication Protocol. Then, the first network interface card may send an action management frame to the first network interface card on the second device across the first secure link. The action management frame itself may comprise the first MAC header and a payload. The payload itself may comprise a vendor-specific information element including identifying information about the second network interface card on the wireless communication device and data packets for implementing a second Extensible Authentication Protocol, as well as an action that instructs the second device to implement the second Extensible Authentication Protocol through a second network interface card of the second device. The second network interface card of the wireless communication device may be configured to receive information to establish a second secure link between the second network interface card of the wireless network device and the second network interface card of the second device.

Yet another aspect of the present disclosure provides a non-transitory, tangible computer readable storage medium, encoded with processor readable instructions to perform a method for authenticating wireless communication links between devices including a plurality of network interface cards. The method may comprise sending a first frame from a first network interface card on first device to a first network interface card on a second device. The first frame itself may comprise a first MAC header that identifies a destination address as a MAC destination address of the first network interface card on the second device and a payload including data packets for implementing a first Extensible Authentication Protocol. The method may then comprise establishing a first secure link between the first network interface card of the first device and the first network interface card of the second device via the first Extensible Authentication Protocol and then sending an action management frame to the first network interface card on the second device across the first secure link. The action management frame may comprise the first MAC header and a payload comprising, the payload itself comprising a vendor-specific information element including identifying information about a second network interface card on the first device and data packets for implementing a second Extensible Authentication Protocol. The payload may also comprise an action that instructs the second device to implement the second Extensible Authentication Protocol through a second network interface card of the second device. Then, the method may include establishing a second secure link between the second network interface card of the first device and the second network interface card of the second device.

BRIEF DESCRIPTION OF THE DRAWINGS

FIG. 4B shows a first secure link that is established across a first frequency band between the two wireless devices of FIG. 4A.

DETAILED DESCRIPTION

Figure 1:
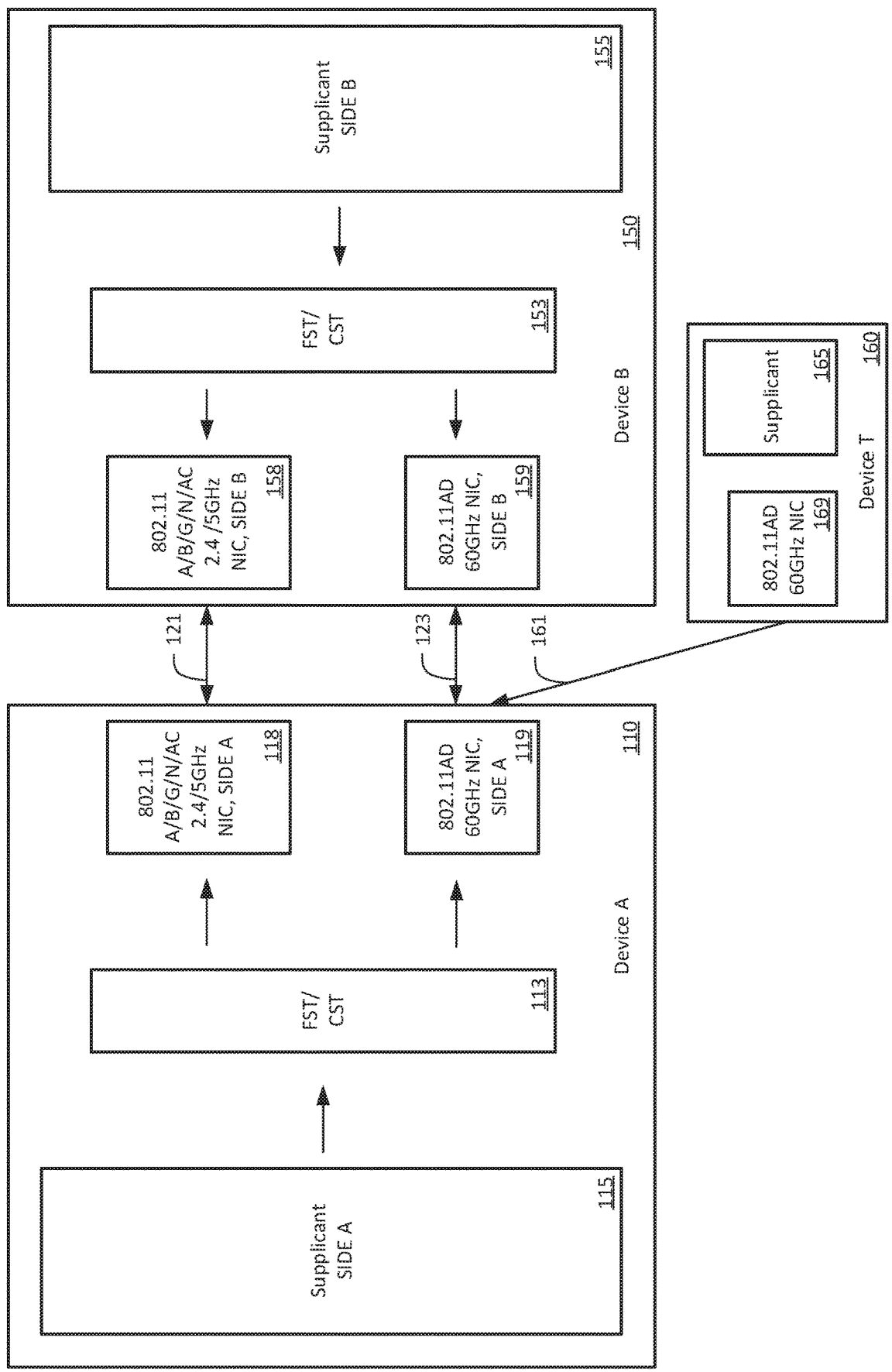
FIG. 1 is a diagram showing how two wireless devices each comprising two network interface cards conduct security handshakes in the prior art, and how a malicious third party device might intercept authentication information.

Modern computing devices that wirelessly connect to the internet and to other devices utilize a range of radio frequencies to do so. There are several frequency ranges allocated to allowing wireless devices and routers to communicate and form local area networks (WLANs), the most common being the 2.4 GHz frequency band and the 5 GHz frequency band, although others are also used. These frequencies, and others, have been used to implement iterations of the IEEE 802.11 specification for WLAN communication. Many existing wireless devices can transmit over multiple frequency bands through network interface cards (NICs) that share a physical layer and media access control (MAC) layer that supports both the 2.4 GHz and 5 GHz frequencies. These devices are known as multi-band devices, because they use multiple frequency bands to support various devices at the frequencies at which those devices transmit. Throughout the present disclosure, the term "wireless devices" may be used to refer to any computing device, wireless router, wireless access point, or wireless repeater that is capable of forming a wireless internet connection.

Recently, the 60 GHz band has begun to be utilized as another transmission frequency for wireless devices. The devices that transmit on this frequency band are known as "WiGig" devices (because their specifications were developed through a consortium called WiGig Alliance, which has since been consolidated with another consortium known as Wi-Fi Alliance). Alternatively, they are also known as "802.11AD" devices, and have physical and MAC layers that comply with the IEEE 802.11AD specification. Transmission at the 60 GHz band with WiGig devices allows for data transfer rates up to 7 Gbits/s, which is much faster than data transfer rates possible at other recent 802.11 specification iterations, such as 802.11AC and 802.11N. However, the 60 GHz signal itself cannot penetrate through walls, and though certain techniques such as beamforming can allow the signal to propagate off of some surfaces to travel longer distances, the other wireless internet bands (e.g., 2.4 GHz and 5 GHz) must often be used by WiGig devices to maintain wireless connectivity when one device leaves the same room as another device with which it has a connection. As a result, WiGig devices typically contain two separate NICs; one that supports the 60 GHz frequency band and one that supports the older "legacy" 2.4 GHz/5 GHz frequency bands. Notably, though the 2.4 GHz and 5 GHz NIC typically share the same physical and MAC layer of a single NIC card, the 60 GHz NIC card is typically separate because it does not share the same physical and MAC layers. It is contemplated that some devices may have one physical board with two chips on them, in which case the two NICs could be described as sharing the "same" physical layer. Furthermore, it is possible to write drivers that provide abstraction of two physical devices into one virtual device. However, it is customary in the art to refer to a "single" NIC as one that has a single MAC layer. Therefore, for the purposes of the present disclosure, any physical board or chip that contains a single MAC layer may be referred to as a single NIC, and in any configuration that contains two MAC layers, the layers may be referred to as separate NICs. The 60 GHz NICs and 2.4/5 GHz NICs may also be referred to as "WiGig NICs" and "legacy NICs," respectively.

In order to establish two secure wireless connections between two wireless devices that each have the 60 GHz NICs and the 2.4/5 GHz NICs, (i.e., one connection over the 60 GHz band and one connection over one of the 2.4 GHz or 5 GHz bands) two security handshakes need to occur. A security handshake is known in the art of networking as a way to establish a secure communication channel between two wireless devices. A number of security handshaking protocols are known in the art, and many of them may be used in accordance with aspects of the present disclosure. Due to the fact that two separate security handshakes may take place between devices containing both the 60 GHz and 2.4/5 GHz platforms, such devices are susceptible to a particular kind of malicious third-party attack known as a "middle-man attack." There are many variations of middle-man attacks known in the art, nearly all of which involve "overhearing" or "eavesdropping" (i.e., intercepting a transmitted signal) information from one or both of the parties involved in the security handshake exchange. Typically, a third-party malicious device will utilize information intercepted from either side A or side B and impersonate one of the parties to the other one of the parties in order to receive sensitive information. Because two handshakes may be used in WiGig devices containing two NICs, a third-party malicious device has multiple opportunities to intercept information from the first handshake and utilize it to impersonate one of the devices during the second handshake. For example, if two devices, called Alice and Bob, attempt to establish a connection though a security handshake, they typically will exchange three messages: a first one from Alice to Bob, a second one from Bob to Alice, and a third back from Alice to Bob. Again, there are many versions of this kind of security handshake known in the art, but in general, one or more of these messages may be intercepted and used to impersonate either Alice or Bob, depending on the particular handshake protocol.

FIG. 1 illustrates how two devices seeking authentication from each other (or one seeking authentication from the other) might do so according to the prior art. Shown are two wireless device A 110 and B 150, each representing two different devices. FIG. 1 is a logical block diagram, and is not intended to be a hardware diagram. Various components may be implemented by hardware alone, software alone, or a combination of hardware and software. Throughout the figures, arrows between various components may generally signify the transmission of some information, some of which may be specified throughout the disclosure.

A supplicant device is known in the art as a device that is seeking authentication from an authenticator. Within a supplicant device, a supplicant driver component, which is typically implemented by software, may be used to execute various steps of the authentication. In FIG. 1, both device A 110 and Device B 150 have components Supplicant Side A 115 and Supplicant Side B 155. Both are called supplicants because they are each seeking authentication from each other, though in other scenarios, one of the devices might be called an "authenticator." In many embodiments, the Supplicants 115 and 116 may be implemented by a specific type of supplicant known as a WPA supplicant, which will be described later in this disclosure. As shown, Device A 110 and Device B 150 each have two NICs. Device A 110 has a 2.4/5 GHz NIC 118, which supports "legacy" 802.11 protocols such as 802.11A, B, G, N, AC, and possibly others. Device A 110 also has a 60 GHz NIC 119, which supports the "WiGig" 802.11 protocol, which is 802.11AD. It is contemplated that both the 2.4/5 GHz NIC 118 and the 60 GHz NIC 119 may also support 802.11 protocols that are yet to be developed and/or implemented. As shown, Device B has a corresponding legacy NIC 158 and WiGig NIC 159.

In FIG. 1 Devices A 110 and B 150 may establish secure wireless connections between their respective legacy NICs 118 and 158 and their WiGig NICs 119 and 159. These connections may be known as separate "links" which may be established across each "band," "channel," or "frequency." For the purposes of clarity in the present disclosure, the term "link" may be used to refer to a wireless internet connection across which information may be exchanged once a security handshake has taken place to authenticate the devices to each other. In the art, the terms "band," "channel," and "frequency" are sometimes used interchangeably though they refer to slightly different concepts (i.e., a "band" is a range around certain exact frequencies at which transmissions may take place, "channels" are subdivided segments of a particular band, and a "frequency" is the precise number of cycles per second.) For purposes of clarity, in this disclosure, the links formed will be referred to those made in relation particular bands; i.e., around the 2.4 GHz band, the 5 GHz band, and the 60 GHz band.

In order for the legacy NICs 118 and 158 to form a secure link over one band, and for the WiGig NICs 119 and 159 to form a separate secure link over another band, each NIC must perform a security handshake with its corresponding NIC. In FIG. 1, the arrows 121 represent the two separate security handshakes between the devices. Each handshake may comprise some identifying information from one or more of Device A 110 and Device B 150. For example, legacy 118 may send this identifying information about Device A 110 in an unencrypted fashion because the secure authentication steps are to be performed subsequently. For example, the legacy NIC 158 from Device B 150 would ordinarily send back a response challenge, a key, a hash, or some other authentication mechanism, to which the legacy NIC 118 of Device A 110 would have to respond with a third, secure answer message. Because two handshakes are taking place, a third party malicious device, Device T 160, may eavesdrop (represented by the arrow 161) on the initial identifying information about Device A 110 from the legacy NIC 118, (the beginning of the first handshake) which may simply be an unencrypted request. Then, it can listen for a similar unencrypted request from the WiGig NIC 119 at Device A 110 (the beginning of the second handshake), and respond as if it is Device B, with its own authentication mechanism, thereby creating a secure connection between Device A 110 and malicious Device T 160.

A protocol known as Fast Session Transfer (FST) has been developed to allow WiGig devices to either switch between multiple bands within the device, or to maintain multiple links across the multiple bands at the same time. For example, a WiGig device may be connected to another WiGig device on the 60 GHz band while both devices are in the same room, but if one of the devices leaves the room, the connection may be switched to the 5 GHz band using the FST protocol. Alternatively, one WiGig device may be connected to another in the same room on both the 60 GHz band and the 5 GHz band at the same time, also utilizing aspects of the FST protocol. Within the FST protocol are two options known as "Transparent" and "Non-Transparent." Transparent FST requires a single MAC layer for both bands, whereas Non-transparent FST may be used to hand off a wireless link from one band to another without sharing a MAC layer. FIG. 1 shows that Device A 110 and Device B 150 both have corresponding FST/CST managing modules 116 and 156, respectively. CST is a version of FST that will be described later in the disclosure. Because Transparent FST requires a single MAC layer for both bands, it is most appropriate for session transfers between the 2.4 GHz and 5 GHz bands, and cannot transfer sessions (links) between the 60 GHz band to either of the other bands. Therefore, Non-Transparent FST is the more appropriate subtype of FST for WiGig devices.

The FST specification could potentially address the security issues pertaining to dual security handshakes and susceptibility to middle-man attacks by performing all security handshakes via one of the links (e.g., via the 5 GHz band alone) and generating keys for both the links (i.e., for both the 5 GHz link and the 60 GHz link). However, aspects of the FST specification that may allow the security handshakes to take place via a single link require modifications to the FST specification at the WPA supplicant level. Making these modifications at the WPA supplicant level creates challenges to implementation, and therefore, such changes have not been widely implemented. One reason for this is that security keys are typically generated for both links by the WPA supplicant of a device, using the different MAC addresses of both NICs. The MAC address information may be obtained by the WPA supplicant from a multi-band information element transmitted on a frame on one link. A multi-band information element is one of the structures carried on various types of management frames such as probe response frames and beacons. The multi-band information element indicates to other devices that the transmitting device is capable of operating in a different frequency band than the one the information was transmitted on, identifies both links, and includes the MAC address of the other NIC. As previously discussed, the component of a wireless device that typically generates keys for authentication is the WPA (Wireless Protected Access) supplicant. A WPA supplicant is typically a software component that is implemented in the Session layer (layer 5) of the OSI Model. It essentially operates as a service or an application in user space. A WPA supplicant also controls authentication of the wireless driver of a device, which is at the Data Link Layer (Layer 2, and part of the MAC layer) of the OSI model. In devices implementing FST, an FST managing module at the Network Layer (Layer 3) of the OSI model also communicates with the NICs (which comprise the Physical Layer (1) and MAC Layer (2)). If two existing devices, both containing a legacy NIC and a WiGig NIC, were to try to connect both bands via a single link and perform FST in prior approaches, certain modifications to the code would have to be made to each device at the WPA supplicant level (Layer 5), above the wireless driver (Layer 2). These changes would have to be made at the WPA supplicant because the WPA supplicant would need to know which devices belong to which link in order to generate keys for both links. These changes must be made to both devices (i.e., each device that is connecting via two links) if both of them are to engage in FST.

Although it is desirable to perform two security handshakes through one link, it is not desirable, and not practical, to modify existing WPA supplicants to accomplish this. One reason this is impractical is because WPA supplicant software is already deployed on numerous existing devices. Many of these existing WPA supplicants conform with the FST specification discussed previously. In order to make changes to WPA supplicants deployed on existing devices, changes would have to be made to the FST kernel, which is open-source, which in turn would require the agreement of the kernel community in order to make the change. Then, the updates to the FST kernel would have to be downloaded to various devices. Because there can be hurdles to implementing certain desired changes to an open-source kernel such as FST, some proprietary solutions that are similar to FST have been developed, including one known as Custom Fast Session Transfer (CST) by Qualcomm, Inc. of San Diego, Calif. CST may be deployed as a software module in devices with dual NICs, including ones that already implement FST, and may be managed by each device's CST/FST managing module at the Network Layer (Layer 3). The CST module is therefore more local to a particular device than the WPA supplicant that operates at the Session Layer (Layer 5). Devices containing CST and FST modules may then establish connections with other devices that only use an FST protocol. FIGS. 4A-4D, therefore, show a CST/FST managing module, to illustrate that the present disclosure may be utilized when either one or both devices has a CST module.

An aspect of the present disclosure provides a method for performing multiple security handshakes for devices with dual NIC architectures that only requires modifications to the local CST managing module of one of the dual NIC devices, and not to the WPA supplicant of one or both devices. A benefit to implementing the present disclosure via a CST module that makes changes only to the local device is that other unwanted side effects that are more likely when changes are made at higher levels may be avoided.

The present disclosure provides a way to perform both security handshakes (i.e., security handshakes for the links between both the 2.4/5 GHz platforms and the 60 GHz platforms) via a single link in order to avoid middle-man attacks. The embodiments described herein may be utilized on either the legacy WiFi internet links or on the 60 GHz WiGig links. The present disclosure utilizes an on-channel tunneling (OCT) mechanism. Tunneling mechanisms (also known as tunneling protocols) are known in the art as a way to provide a service through a link that does not typically support the service by putting necessary information in the payload of frames or packets that are normally used for something else. In this particular kind of tunneling protocol, which is through one particular band, data packets that are normally defined for management of the link (i.e., in management frames, which will be discussed in more detail presently) are used to transport EAP information for both links across a single link. EAP stands for Extensible Authentication Protocol, which itself is a way to authenticate a connection between two devices (i.e., it is protocol that enables the performance of several types of security handshakes, including WPA, WPA2, PWPA2-PSK, WPA2-Enterprise, etc.). EAPOL, which stands for Extensible Authentication Protocol over LAN, particularly specifies how EAP information may be encapsulated and transmitted in 802.11 frames.

Figure 2:
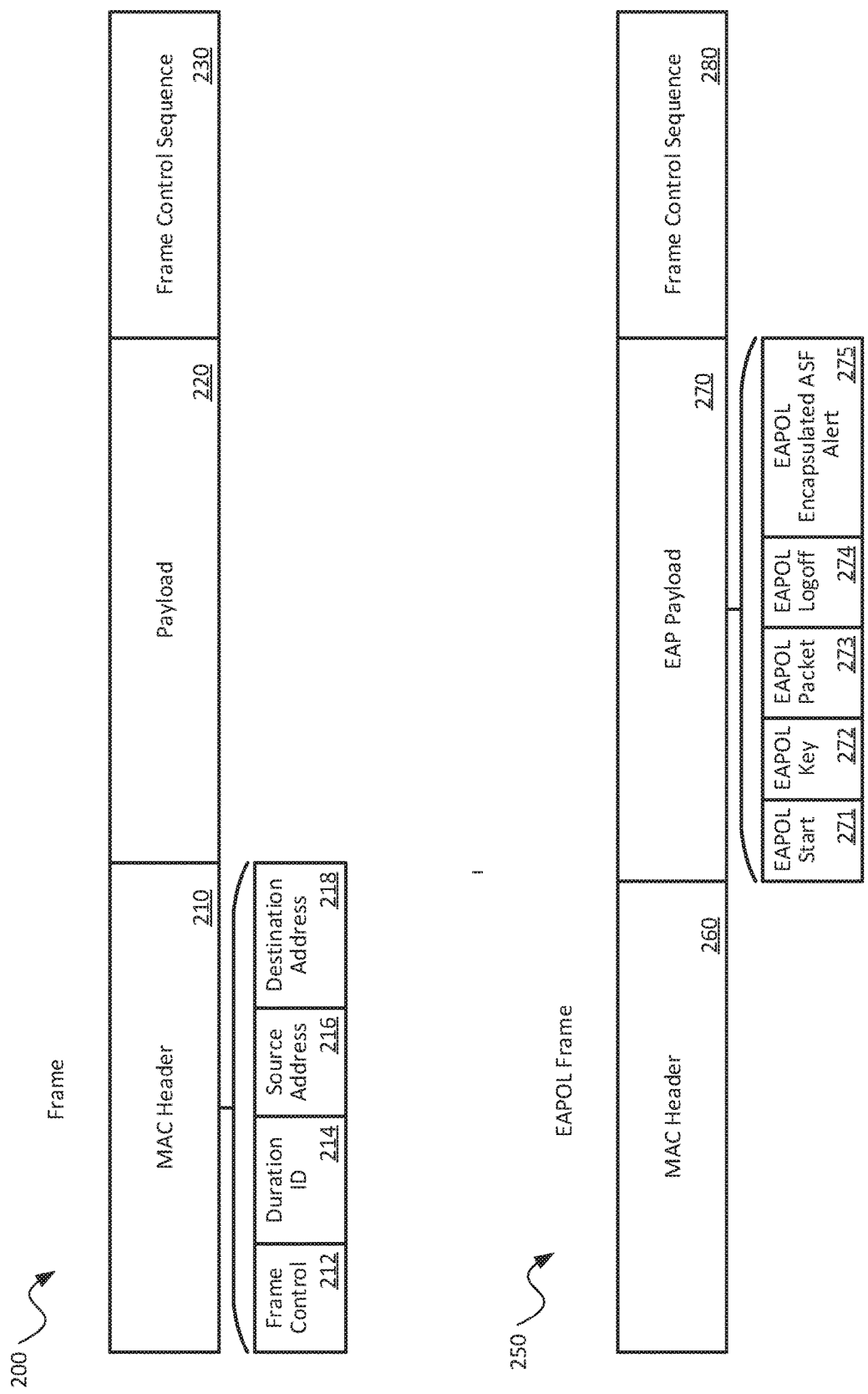
FIG. 2 depicts the typical contents of a frame that transports information across a data link layer and a specific type of frame known as an Extensible Authentication Protocol over LAN frame.

Frames are known in the art as the data units of information at the MAC layer (also known as the data link layer, or layer 2) of the OSI network model. It is also known in the art that each frame is comprised of particular kinds of information, which includes a MAC header, a payload, and a frame check sequence. The payload may comprise various information and may vary in size. Some of the information comprising the payload may include information from higher layers. For example, EAPOL operates at the network layer (layer 3) and its data units are referred to as packets. EAPOL data packets, therefore, may be sent within frames. There are several types of frames that are particularly known as management frames, which are used to establish and maintain communication between two devices. One type of frame is known as an EAPOL frame, which is typically the kind of frame through which EAP packets may be sent in the frame's payload. Shown in FIG. 2 are diagrams of a frame 200 and an EAPOL frame 250. The frame 200 comprises a MAC header 210, a payload 220, and a Frame Control Sequence 230. A MAC header typically comprises at least the information shown in FIG. 2, which includes a Frame Control 212, a Duration ID 214, a Source Address 216, and a Destination Address 218. The Source Address 216 may comprise identifying address information of the MAC layer from which it originates. The Destination Address 218 may comprise address information for the MAC layer of the NIC to which the frame is to be sent. Though there are various naming conventions for the Source Address 216 and the Destination Address 218, all MAC headers contain at least some version of these components. Depending on the type of frame it is, the payload 220 may vary significantly based on the purpose of the frame, and may have none or very little data, or may have a large and/or significant amount of data.

The EAPOL frame 250 also comprises a MAC header 260, which may generally be the same or similar to the MAC header 210 of the frame 200. The EAPOL frame 250, as shown has an EAP payload 270 comprising data packets that are necessary for implementing an EAP protocol. These packets may implement such known EAP steps as EAPOL Start 271, EAPOL Key 272, EAPOL Packet 273, EAPOL Logoff 274, and EAPOL Encapsulated ASF Alert 275. Not all of the steps depicted herein are necessarily executed for every type of EAP, nor are they necessarily implemented in the order depicted. It is contemplated that any variation of EAP may be utilized without departing from the scope of the present disclosure.

In a device that has two different NICs, and therefore two different physical and MAC layers, a typical EAPOL frame (or any other frame) cannot simply be sent across a first band in order to establish a secure link with a second band. This is because the beginning of any given frame comprises a MAC header that is addressed to one particular MAC layer. For example, referring back to FIG. 1, if the legacy NIC 118 were to transmit an EAPOL frame to the legacy NIC 158 to establish a secure connection, the MAC header of the EAPOL frame would be specifically addressed to the MAC of the legacy NIC 158, and not to the WiGig NIC 159. An aspect of the present disclosure allows the EAPOLs required to establish both links to be transmitted via just one of the frequency bands. The EAPOL data packets for the first band may be transmitted normally in an EAPOL frame (e.g., EAPOL frame 250) because the packets are locally addressed to the MAC layer of the first NIC (via the MAC header 260). That is, the normal EAPOL that establishes a security handshake protocol across one of the bands (for example, across one of the legacy NIC bands) creates a first secure link that may be used as a tunnel for the second security handshake to take place.

Figure 3:
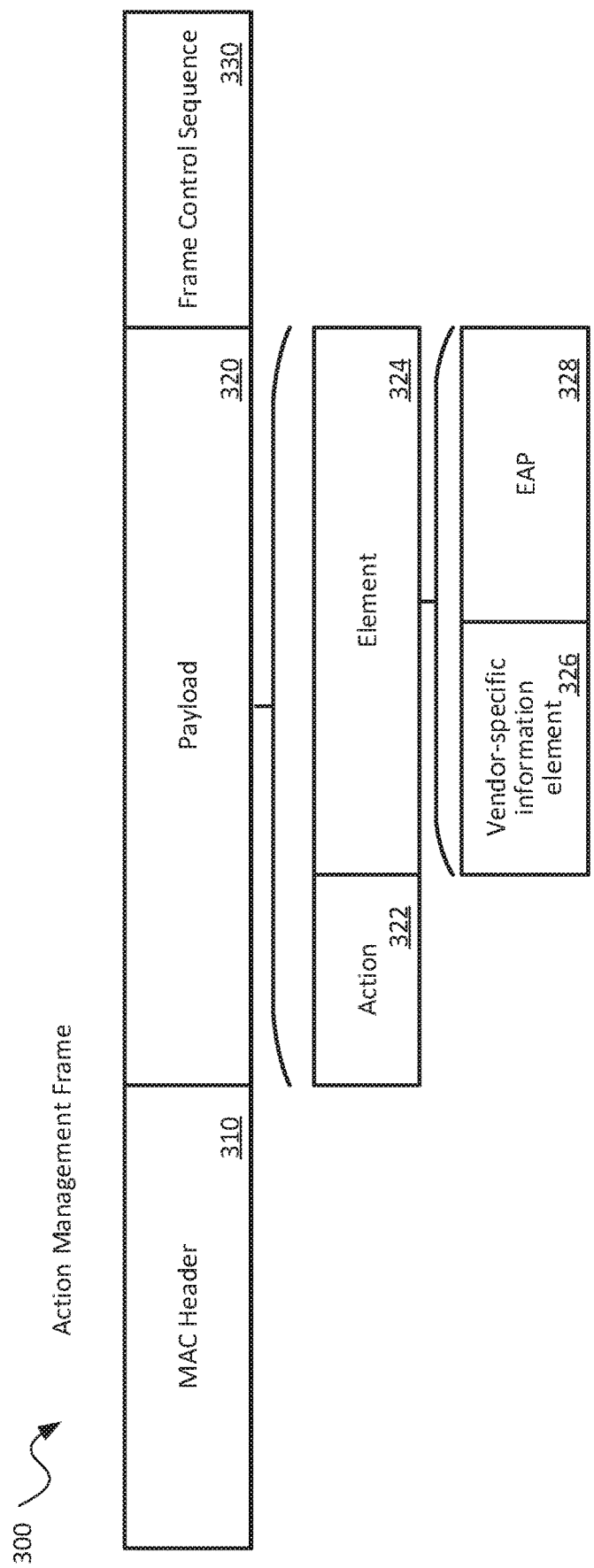
FIG. 3 depicts the contents of an action management frame according to embodiments of the present disclosure.

In order to establish the second secure link across the other frequency band, an aspect of the disclosure utilizes a particular type of management frame known as an action management frame. FIG. 3 shows an action management frame 300 comprising a MAC Header 310, a payload 320, and a Frame Control Sequence 330. There are many types of action management frames that are used for various purposes in maintaining device communication, most of which are defined by containing an action (e.g., a command) and an element (e.g., information upon which the action may act). In FIG. 3, the payload 320 comprises an action 322 and an element 324. The element 324 may specifically comprise a vendor-specific information element 326 and EAP data packets 328. The vendor-specific information element 326 may comprise a reserved ID, which means that if an element has this ID, it contains information which is not necessarily part of the 802.11x specification, but with which a vendor may utilize for a variety of different purposes. In this particular case, the vendor-specific information element is used to transfer the EAP frames of the second link. Through the action 322, the receiving NIC can be instructed to route the element 324 to CST/FST managing module and the WPA Supplicant of the second device, which will be described in more detail presently. These EAP frames that are particular to the second link can be used to perform a security handshake at the higher OSI layers (e.g., layer 3 and layer 5), allowing the lower OSI layers (e.g., layers 1 and 2) of the second NIC on the second device to establish a secure connection with the second NIC on the first device. An advantage of the present disclosure is that wrapping EAP data packets within an action management frame only requires that modifications be made to the CST module, rather than at the WPA supplicant driver level. As described previously, the module that manages CST and/or FST operates at the Network layer (Layer 3) of the OSI model, and is therefore more local to the device than the WPA supplicant. Another benefit of implementing aspects of the present disclosure in a CST module is that only one of the two connecting devices may require the CST module in order to perform the security handshakes over one link.

Figure 4A:
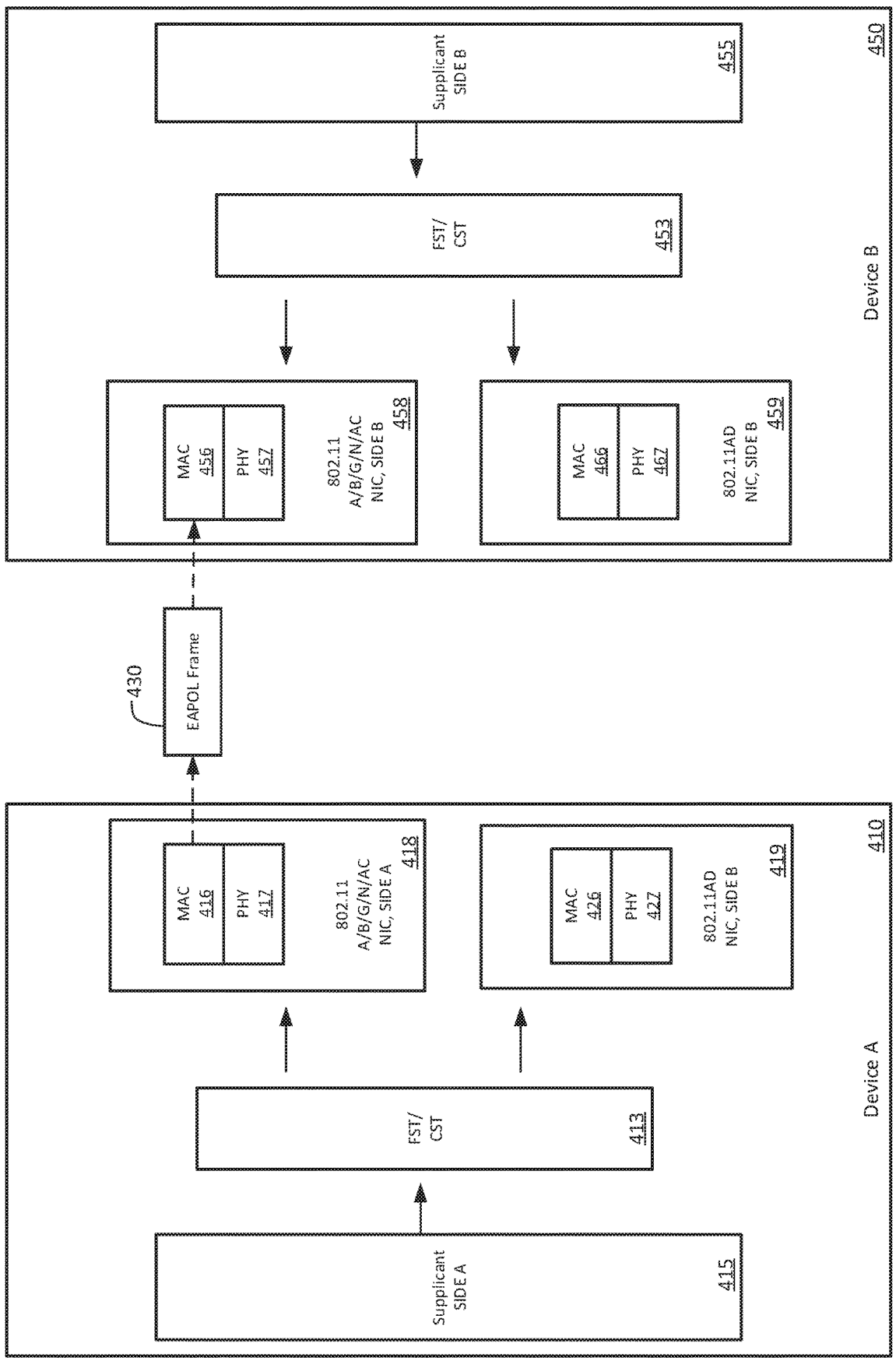
FIG. 4A shows how a security handshake may be initiated across a first frequency band between a first network interface card of a first device and a first network interface card on a second device.

Turning now to FIGS. 4A-4D, shown are a series of diagrams illustrating how secure links across two frequency bands on two separate NICs may be established according to the present disclosure. FIG. 4A is a diagram of how a first link between NICs on the same channel may be established though a typical EAPOL frame. As shown, the EAPOL frame 430, comprising the destination MAC address of the MAC layer 456 of the legacy NIC 458. The EAPOL frame 430 may comprise EAP data packets that allow for the execution of the EAP—the necessary security handshake—between the legacy NICs 418 and 458. FIG. 4B illustrates that a first secure link 432 is now established between the legacy NICs 418 and 458. The first secure link 432 may be established across a 2.4 GHz band or a 5 GHz band.

Figure 4C:
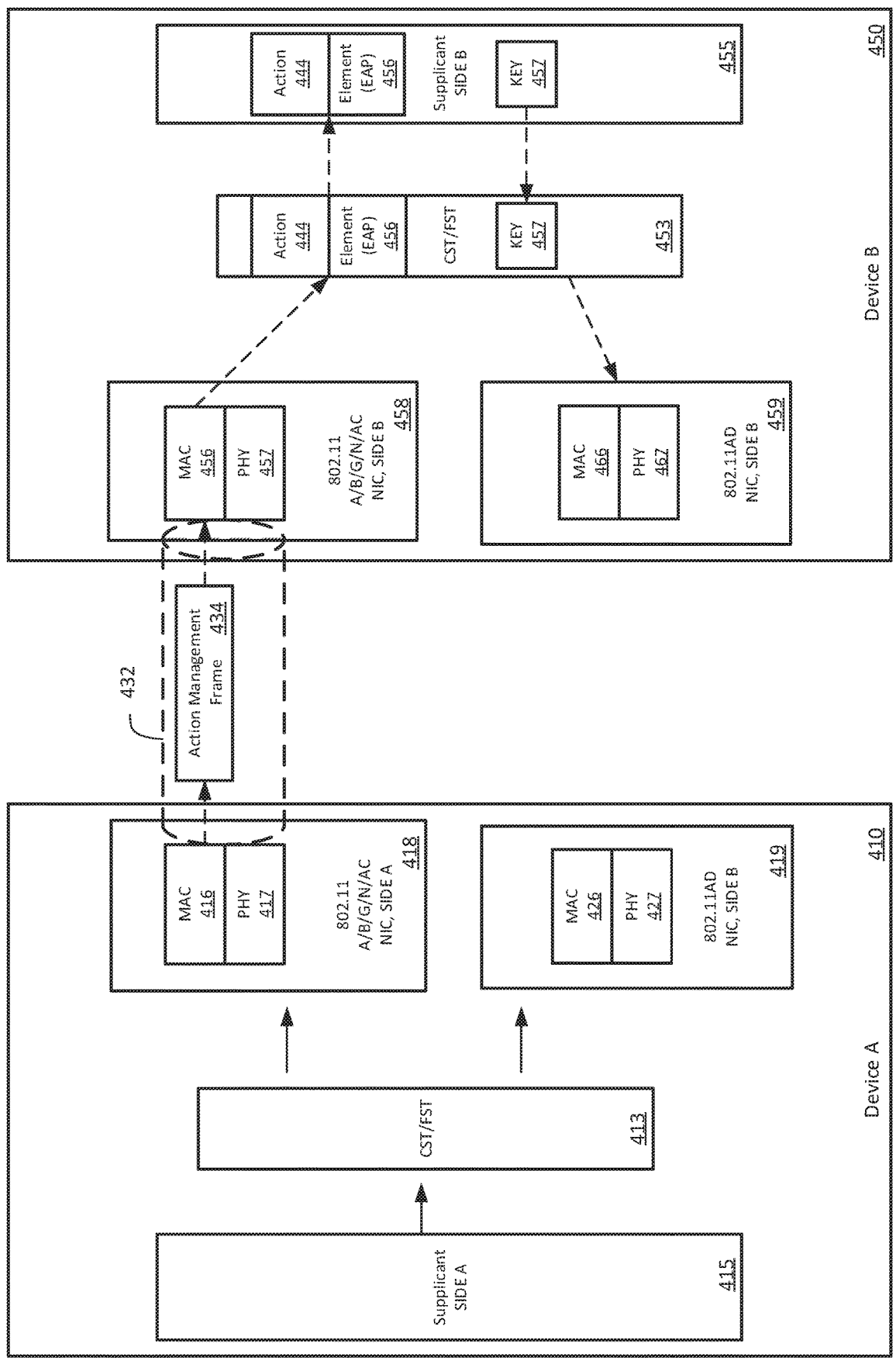
FIG. 4C shows how information for performing a security handshake between a second network interface card on the first device and a second network interface card the second device may be transmitted via the first secure link.

FIG. 4C shows that an action management frame 434 may be transmitted via the first secure link 432. The action management frame 434 may be similar to the action management frame 300 of FIG. 3, in that it comprises an action and an element which itself comprises a vendor-specific information element and EAP data packets. The action management frame 434 may specifically comprise a vendor-specific information element regarding the WiGig NIC 419 (i.e, the second NIC on the first device 410) and EAP data packets for executing an EAP security handshake between the WiGig NIC 459 (i.e., the second NIC on the second device 450) and the WiGig NIC 419. As shown, the action 444 and the element 455 are routed from the legacy NIC 458 to the CST/FST managing module 453, which then sends them to the WPA supplicant 455. The WPA supplicant 455 can then generate a key 457 for the second link and send that key 457 to the CST/FST managing module 453. Then, the CST/FST managing module can perform the security handshake as if the EAP information had been sent through the second link, even though it was actually sent via the first link. In other words, it does not matter from which link the second device receives the EAP information, because as long as that EAP information is eventually received by the WPA supplicant 455, the CST/FST module 453 receives the resulting keys 457 necessary to perform the security handshake for the second link. Because the CST/FST managing module 453 is logically above (at layer 3) the drivers of both NICs (458 and 459, at layers 1 and 2), the CST/FST managing module 453 can communicate with each NIC directly. The arrow 461 represents the communication of the successful security handshake between the CST/FST managing module 453 and the NIC 459.

Figure 4D:
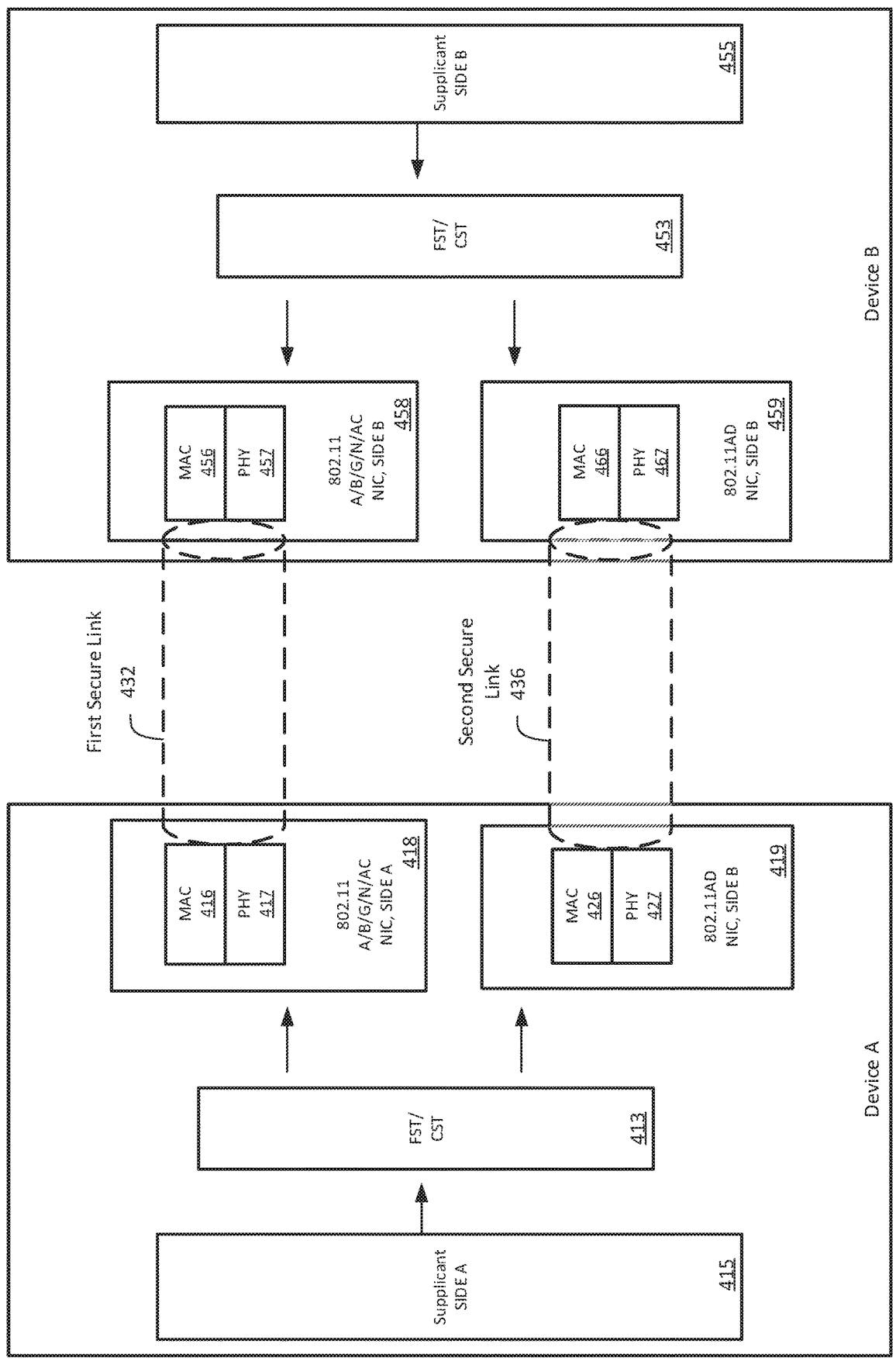
FIG. 4D shows a first and a second secure link that are established across two different frequency bands between the two wireless devices.

Then, once the CST/FST module 453 has performed a security handshake with the EAP and key information 457 for the second link, the WiGig NIC 459 may physically establish a second secure link between itself and the WiGig NIC 419. FIG. 4D shows that a second secure link 436 is established between the WiGig NICs 419 and 459, across the 60 GHz frequency band. In essence, the lower OSI layers of the first link (the PHY at layer 1 and MAC at layer 2) are used to transmit the information that allows the higher OSI layers (the CST/FST managing module at layer 3 and the WPA supplicant at layer 5) to perform the security handshake for the second link. In this way, two security handshakes are performed for links across two different frequency bands via a single frequency band. In an alternative embodiment, the first secure link may be established via the WiGig NICs (i.e., across the 60 GHz link) and the action management frame may be sent with the EAP information for the legacy NICs so that the second link is established across the 2.4/5 GHz link.

Figure 5:
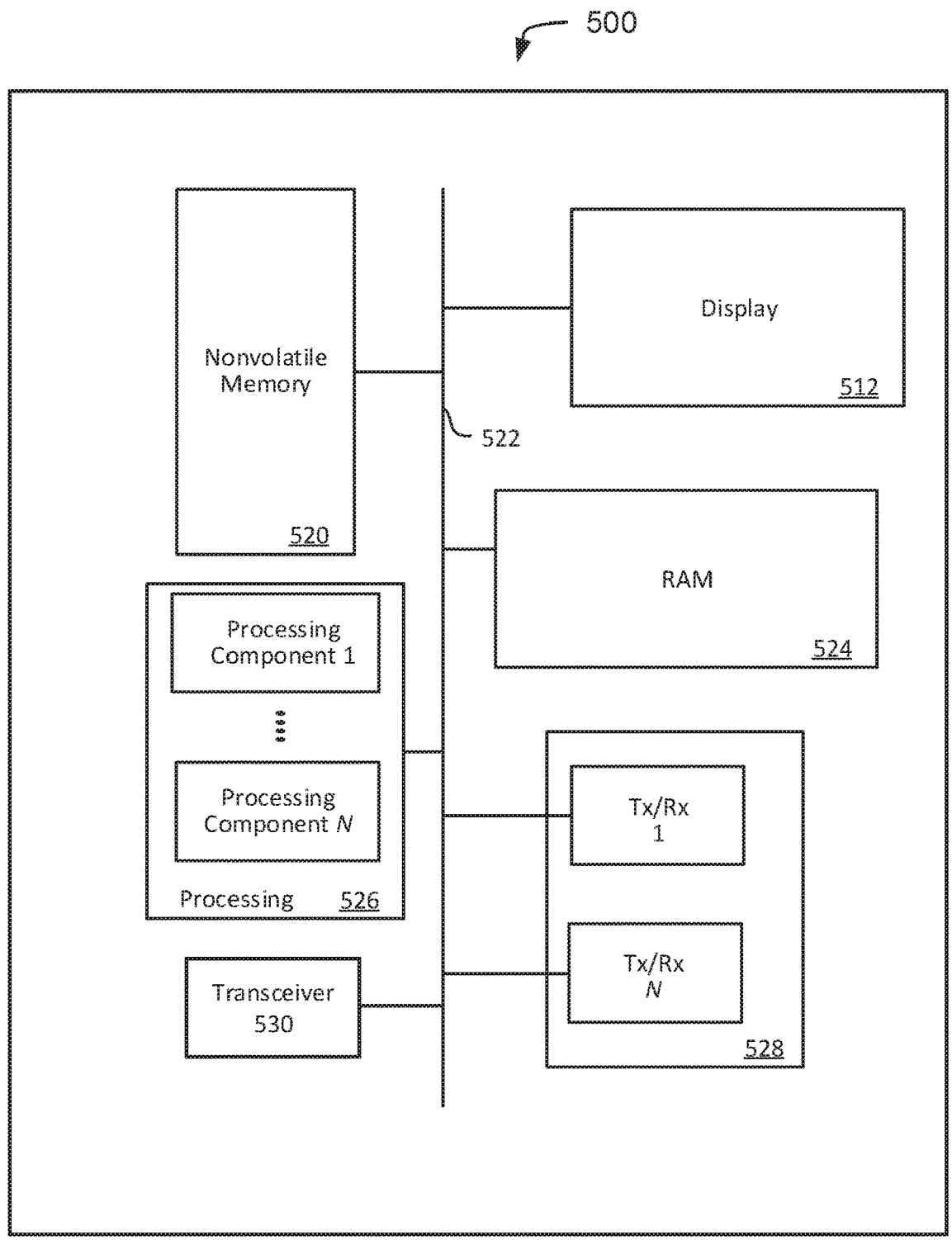
FIG. 5 is a logical block diagram of a computing device that may implement aspects of the present disclosure.

Referring next to FIG. 5, shown is a block diagram depicting high-level physical components of an exemplary computing device 500 that may be utilized to realize a wireless computing device of the present disclosure. As shown, the computing device 850 in this embodiment includes an optional display portion 512, nonvolatile memory 520, and a transceiver 530 that are coupled to a bus 522 that is also coupled to random access memory ("RAM") 524, and a processing portion (which includes N processing components) 526. The transceiver 530 may include NICs such as NIC 418 and NIC 419 in FIGS. 4A-4D. Although the components depicted in FIG. 5 represent physical components, FIG. 5 is not intended to be a hardware diagram; thus many of the components depicted in FIG. 5 may be realized by common constructs or distributed among additional physical components. Moreover, it is certainly contemplated that other existing and yet-to-be developed physical components and architectures may be utilized to implement the functional components described with reference to FIG. 5.

The optional display portion 512 generally operates to provide a presentation of content to a user, but many devices that implement aspects of the present disclosure, such as wireless routers, may not have a display at all. In implementations with a display, the display is realized by an LCD or OLED display. In general, the nonvolatile memory 520 functions to store (e.g., persistently store) data and executable code including code that is associated with the functional components described herein, in addition to other functions and aspects of the nonvolatile memory unique to the present disclosure. In some embodiments for example, the nonvolatile memory 520 includes bootloader code, modem software, operating system code, file system code, and code to facilitate the implementation of one or more aspects of the disclosure, including, for example, a WPA supplicant and CST.

In many implementations, the nonvolatile memory 520 is realized by flash memory as described throughout the disclosure (e.g., NAND or ONENAND™ memory), but it is certainly contemplated that other memory types may be utilized as well, such as traditional hard disk drives. Although it may be possible to execute the code from the nonvolatile memory 520, the executable code in the nonvolatile memory 520 is typically loaded into RAM 524 and executed by one or more of the N processing components in the processing portion 526. In many embodiments, the system memory may be implemented through the nonvolatile memory 520, the RAM 524, or some combination thereof.

The N processing components in connection with RAM 524 generally operate to execute the instructions stored in nonvolatile memory 520 to effectuate the functional components described herein. As one of ordinarily skill in the art will appreciate, the processing portion 526 may include a video processor, modem processor, DSP, and other processing components.

Figure 6:
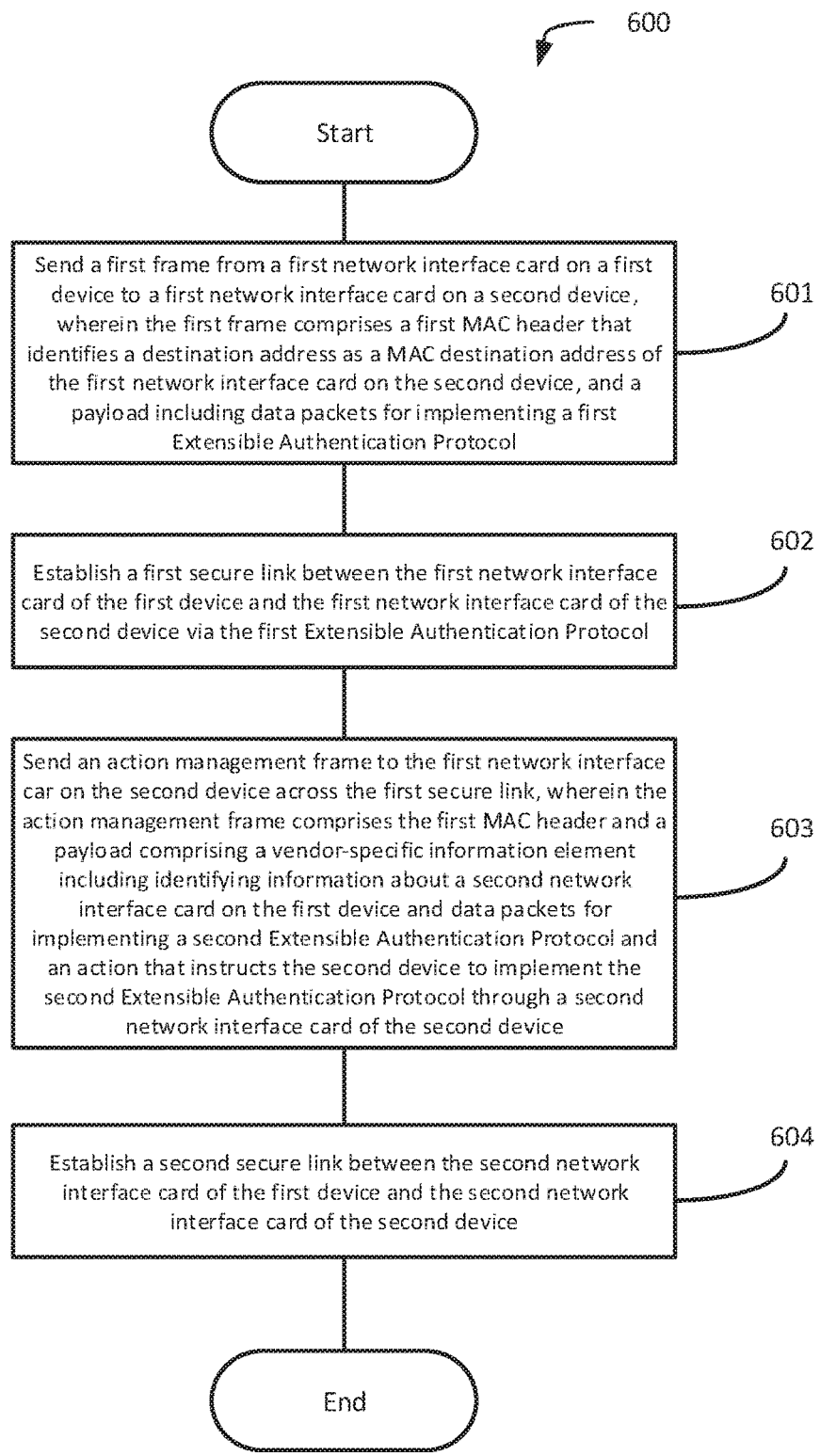
FIG. 6 is a flowchart which may be traversed to perform a method for connecting wireless devices according to aspects of the present disclosure.

FIG. 6 is a flowchart which may be traversed to perform a method 600 in accordance with the present disclosure The method 600 may comprise sending a first frame from a first network interface card on first device to a first network interface card on a second device at step 601. The first frame itself may comprise a first MAC header that identifies a destination address as a MAC destination address of the first network interface card on the second device and a payload including data packets for implementing a first Extensible Authentication Protocol. At step 602, the method may then comprise establishing a first secure link between the first network interface card of the first device and the first network interface card of the second device via the first Extensible Authentication Protocol. Then, at step 603, the method may comprise sending an action management frame across the first secure link. The action management frame may comprise the first MAC header and a payload comprising, the payload itself comprising a vendor-specific information element containing identifying information about a second network interface card on the first device and data packets for implementing a second Extensible Authentication Protocol. The payload may also comprise an action that instructs the second device to implement the second Extensible Authentication Protocol through a second network interface card of the second device. Then, at step 604, the method may include establishing a second secure link between the second network interface card of the first device and the second network interface card of the second device.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for authenticating wireless communication links between devices including a plurality of network interface cards, the method comprising:
   sending a first frame from a first network interface card on first device to a first network interface card on a second device, wherein the first network interface card on the first device and the first network interface card of the second device operate on a first frequency band, and wherein the first frame comprises:
      a first Media Access Control (MAC) header that identifies a destination address as a MAC destination address of the first network interface card on the second device, and
      a payload including data packets for implementing a first Extensible Authentication Protocol;
   establishing a first secure link between the first network interface card of the first device and the first network interface card of the second device via the first Extensible Authentication Protocol across the first frequency band;
   sending an action management frame to the first network interface card on the second device across the first secure link on the first frequency band, wherein the action management frame comprises;
      the first MAC header,
      a payload comprising;
         a vendor-specific information element including:
            identifying information about a second network interface card on the first device; and
            data packets for implementing a second Extensible Authentication Protocol;
      an action that instructs the second device to implement the second Extensible Authentication Protocol through a second network interface card of the second device, and
      performing, at a Fast Session Transfer module level, a security handshake with a key generated at a WiFi Protected Access (WPA) supplicant level for a second secure link;
   establishing the second secure link between the second network interface card of the first device and the second network interface card of the second device across a second frequency band.

2. The method of claim 1, wherein the first secure link is established over either a 2.4 GHz frequency band or a 5 GHz frequency band and the second secure link is established over a 60 GHz frequency band.

3. The method of claim 2, wherein the first device uses Custom Fast Session Transfer protocol to switch between links between the 2.4 GHz frequency band or the 5 GHz frequency band and the 60 GHz frequency band.

4. The method of claim 1, wherein either the first device or the second device is a wireless router.

5. The method of claim 1, wherein the action management frame is generated by local commands at a wireless driver of the first device.

6. The method of claim 1, wherein the action that instructs the second device to implement the second Extensible Authentication Protocol utilizes a WPA supplicant at the second device to generate a key, and the key is used to perform a security handshake between the second network interface card of the first device and the second network interface card of the second device.

7. A wireless communication device comprising:
a transceiver; and
a first network interface card and a second network interface card, the first network interface card configured to:
send a first frame via the transceiver to a first network interface card of a second wireless communication device, wherein the first network interface card on the first device and the first network interface card of the second device operate on a first frequency band, and, wherein the first frame comprises:
a first Media Access Control (MAC) header that identifies a destination address as a MAC destination address of the first network interface card of the second wireless communication device, and
a payload including data packets for implementing a first Extensible Authentication Protocol;
establish a first secure link between the first network interface card of the wireless communication device and the first network interface card of the second device via the first Extensible Authentication Protocol across the first frequency band, and
send an action management frame to the first network interface card on the second device across the first secure link on the first frequency band, wherein the action management frame comprises:
the first MAC header,
a payload comprising:
a vendor-specific information element including:
identifying information about a second network interface card on the first device; and
data packets for implementing a second Extensible Authentication Protocol;
an action that instructs the second device to implement the second Extensible Authentication Protocol through a second network interface card of the second device, and
performing, at a Fast Session Transfer module level, a security handshake with a key generated at a WiFi Protected Access (WPA) supplicant level for a second secure link;
establishing the second secure link between the second network interface card of the first device and the second network interface card of the second device across a second frequency band.

8. The wireless communication device of claim 7, wherein the first network interface card transmits over either a 2.4 GHz frequency band or a 5 GHz frequency band and the second network interface card transmits over a 60 GHz frequency band.

9. The wireless communication device of claim 8, wherein the wireless communication device utilizes Custom Fast Session Transfer protocol to switch between links between the 2.4 GHz frequency band or the 5 GHz frequency band and the 60 GHz frequency band.

10. The wireless communication device of claim 7, wherein the wireless communication device is a wireless router.

11. The wireless communication device of claim 7, further comprising a processor, a memory, and a wireless driver, wherein the wireless driver is configured to generate the action management frame.

12. A non-transitory, tangible computer readable storage medium, encoded with processor readable instructions to perform a method for authenticating wireless communication links between devices including a plurality of network interface cards, the method comprising:
sending a first frame from a first network interface card on first device to a first network interface card on a second device, wherein the first network interface card on the first device and the first network interface card of the second device operate on a first frequency band, and wherein the first frame comprises:
a first Media Access Control (MAC) header that identifies a destination address as a MAC destination address of the first network interface card on the second device, and
a payload including data packets for implementing a first Extensible Authentication Protocol;
establishing a first secure link between the first network interface card of the first device and the first network interface card of the second device via the first Extensible Authentication Protocol across the first frequency band;
sending an action management frame to the first network interface card on the second device across the first secure link on the first frequency band, wherein the action management frame comprises;
the first MAC header,
a payload comprising;
a vendor-specific information element including:
identifying information about a second network interface card on the first device; and
data packets for implementing a second Extensible Authentication Protocol;
an action that instructs the second device to implement the second Extensible Authentication Protocol through a second network interface card of the second device, and
performing, at a Fast Session Transfer module level, a security handshake with a key generated at a WiFi Protected Access (WPA) supplicant level for a second secure link;
establishing the second secure link between the second network interface card of the first device and the second network interface card of the second device across a second frequency band.

13. The non-transitory, tangible computer readable storage medium of claim 12, wherein the first secure link is established over either a 2.4 GHz frequency band or a 5 GHz frequency band and the second secure link is established over a 60 GHz frequency band.

14. The non-transitory, tangible computer readable storage medium of claim 13, wherein the first device uses Custom Fast Session Transfer protocol to switch between links between the 2.4 GHz frequency band or the 5 GHz frequency band and the 60 GHz frequency band.

15. The non-transitory, tangible computer readable storage medium of claim 12, wherein either the first device or the second device is a wireless router.

16. The non-transitory, tangible computer readable storage medium of claim 12, wherein the action management frame is generated by local commands at a wireless driver of the first device.

17. The non-transitory, tangible computer readable storage medium of claim 12, wherein the action that instructs the second device to implement the second Extensible Authentication Protocol utilizes a WPA supplicant at the second device to generate a key, and the key is used to perform a security handshake between the second network interface card of the first device and the second network interface card of the second device.

* * * * *